United States Patent [19]
Mori

[11] Patent Number: 5,239,657
[45] Date of Patent: Aug. 24, 1993

[54] COUNTED VALUE STORAGE SYSTEM WITH RECIRCULATIVE ADDRESSING

[75] Inventor: Hiroshi Mori, Yokohama, Japan

[73] Assignee: Ricoh Company, Ltd., Tokyo, Japan

[21] Appl. No.: 556,881

[22] Filed: Jul. 23, 1990

[30] Foreign Application Priority Data

Jul. 31, 1989 [JP] Japan .................................. 1-198703

[51] Int. Cl.$^5$ .............................................. G01C 22/00
[52] U.S. Cl. ................................ 364/800; 364/DIG. 2; 364/942.7
[58] Field of Search ................... 364/DIG. 1, DIG. 2; 395/800, 400, 425; 377/27, 28, 33, 44, 46, 52, 54

[56] References Cited

U.S. PATENT DOCUMENTS 4,710,888 12/1987 Burke et al. ........................... 364/561
4,803,646 2/1989 Burke et al. ........................... 364/561

*Primary Examiner*—Robert B. Harrell
*Attorney, Agent, or Firm*—Cooper & Dunham

[57] ABSTRACT

A counted value storage system includes a non-volatile memory for successively storing a counted value in one of a plurality of memory areas assigned with addresses, and a control unit coupled to the non-volatile memory for controlling the address where the counted value is stored in the non-volatile memory, where the control unit includes the functions of circulatively designating the address from a smallest address and storing a predetermined data in the non-volatile memory at an address which is one greater than an arbitrary address where a most update counted value is stored. The address where the predetermined data is stored indicates an address where a next counted value is to be stored, and the predetermined data indicates a value which is greater than a maximum value of a counted value which is stored in the non-volatile memory.

12 Claims, 6 Drawing Sheets

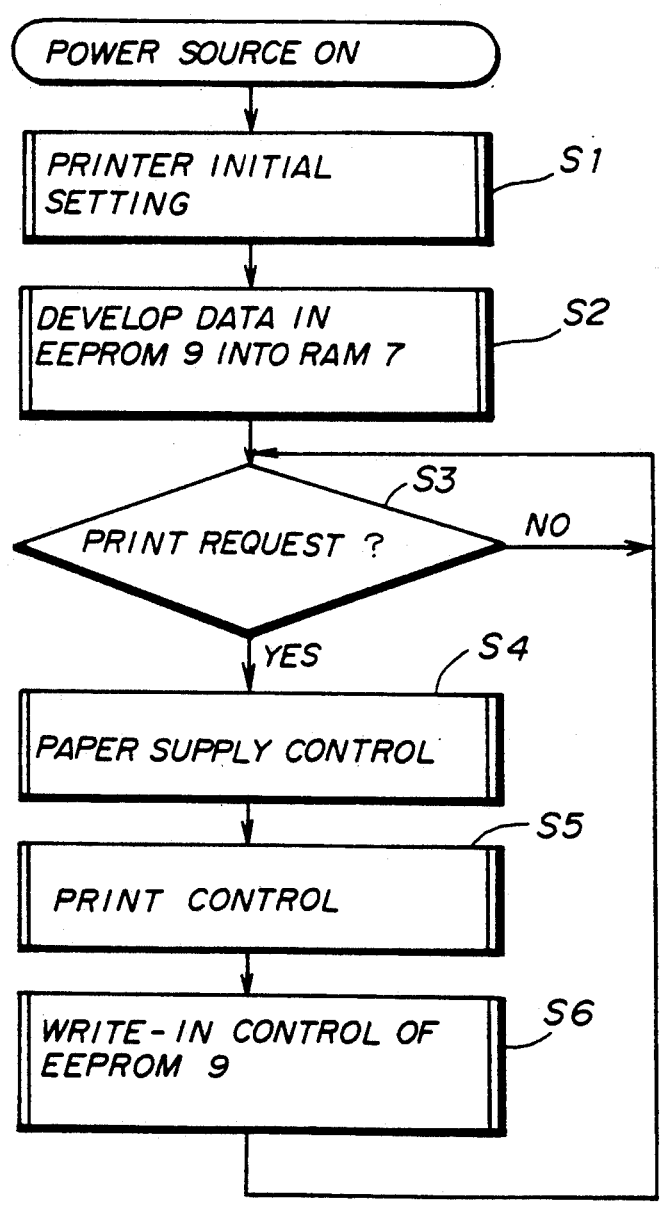

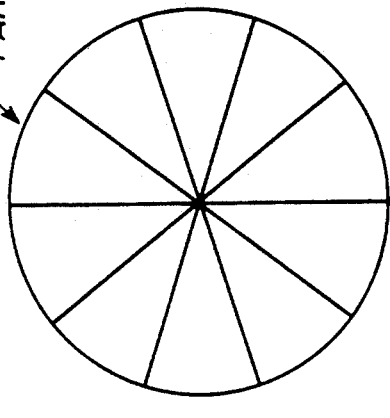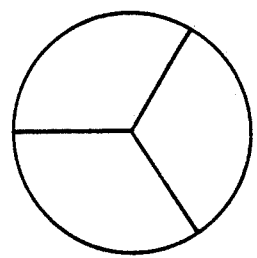
FIG. 7A PRIOR ART
FIG. 7B PRIOR ART
FIG. 7C

COUNTED VALUE STORAGE SYSTEM WITH RECIRCULATIVE ADDRESSING

BACKGROUND OF THE INVENTION

The present invention generally relates to counted value storage methods and systems, and more particularly to a counted value storage method and system which store a counted value and is suited for storing counted values corresponding to a number of prints, rotation time of a motor, a current applying time and the like in an image forming apparatus such as a printer.

In an image forming apparatus such as a laser printer, a copying machine and a facsimile machine, counted values corresponding to a number of prints, rotation time of a motor, a current applying time and the like are stored in a non-volatile memory. For example, the non-volatile memory is a serial read/write electrically erasable programmable read only memory (EEPROM), and data related to the counted values are successively stored in one or a plurality of memory areas of the EEPROM using a pointer.

Generally, there is the limit to a number of times a write operation can be carried out in the EEPROM. When a 16-bit EEPROM is used, for example, a memory capacity of 10 words is required to count 100,000 when the EEPROM is limited to 10,000 write operations.

However, within one word which is made up of 16-bits, one horizontal parity bit is required to make a parity check for detecting a binary code error as shown in FIG. 1. As a result, a data part of one word is made up of 15bits, and a maximum number which can be described by this data part is 32768. In this case, it is impossible to count up to 100,000. For this reason, an upper word is conventionally provided to describe upper digits. In other words, lower words and an upper word are provided.

Accordingly, one lower word is used to count up to 10,000, and this lower word is then discarded. A next lower word is used to count up to another 10,000. The counting is carried out similarly thereafter, and ten lower words are used to count up to 100,000. For this reason, when an error is generated in the data which is counted when reading the data from the EEPROM, it is impossible to correct the error and the counting operation is stopped at this point or a new counting operation is started from this point. However, when starting the new counting operation, there is a problem in that the data of the counted value is no longer reliable.

On the other hand, according to the conventional counted value storage system, the pointer which indicates the write-in address of the next counted value must also be stored in the EEPROM. As a result, there is a problem in that the available memory capacity of the EEPROM becomes limited due to the necessity to store the pointer.

SUMMARY OF THE INVENTION

Accordingly, it is a general object of the present invention to provide a novel and useful counted value storage method and system in which the problems described above are eliminated.

Another and more specific object of the present invention is to provide a counted value storage system comprising non-volatile memory means for successively storing a counted value in one of a plurality of memory areas having respective addresses, and control means coupled to the non-volatile memory means for controlling the address where the counted value is stored in the non-volatile memory means, where the control means includes means for circulatively designating the address from a lowest order address and means for storing a predetermined data in the non-volatile memory means at an address which is one greater than an arbitrary address where a most recently updated counted value is stored. The address where the predetermined data is stored indicates an address where a next counted value is to be stored, and the predetermined data indicates a value which is greater than a maximum value of a counted value which is stored in the non-volatile memory means. According to the counted value storage system of the present invention, it is possible to provide a sufficiently large memory capacity for the data because no memory area is required for a pointer which indicates the write-in address. In addition, by providing a parity check function, it is possible to simultaneously correct erroneous data when reading the counted value from the non-volatile memory means.

Still another object of the present invention is to provide a counted value storage method comprising the steps of successively storing a counted value in one of a plurality of memory areas of a non-volatile memory assigned with addresses, circulatively designating the address of the non-volatile memory from a lowest order address, and storing a predetermined data in the non-volatile memory at an address which is one greater than an arbitrary address where a most recently updated counted value is stored, where the address where the predetermined data is stored indicates an address where a next counted value is to be stored, and the predetermined data indicates a value which is greater than a maximum value of a counted value which is stored in the non-volatile memory. According to the counted value storage method of the present invention, it is possible to provide a sufficiently large memory capacity for the data because no memory area is required for a pointer which indicates the write-in address. In addition, by providing a parity check function, it is possible to simultaneously correct erroneous data when reading the counted value from the non-volatile memory means.

Other objects and further features of the present invention will be apparent from the following detailed description when read in conjunction with the accompanying drawings.

BRIEF DESCRIPTION OF THE DRAWINGS

FIG. 3 is a flow chart for explaining a main routine of a main control unit shown in FIG. 2;

FIGS. 7A, 7B and 7C are diagrams for explaining the memory areas of the RAM in comparison with the conventional counted value storage system.

DESCRIPTION OF THE PREFERRED EMBODIMENTS

Figure 1:
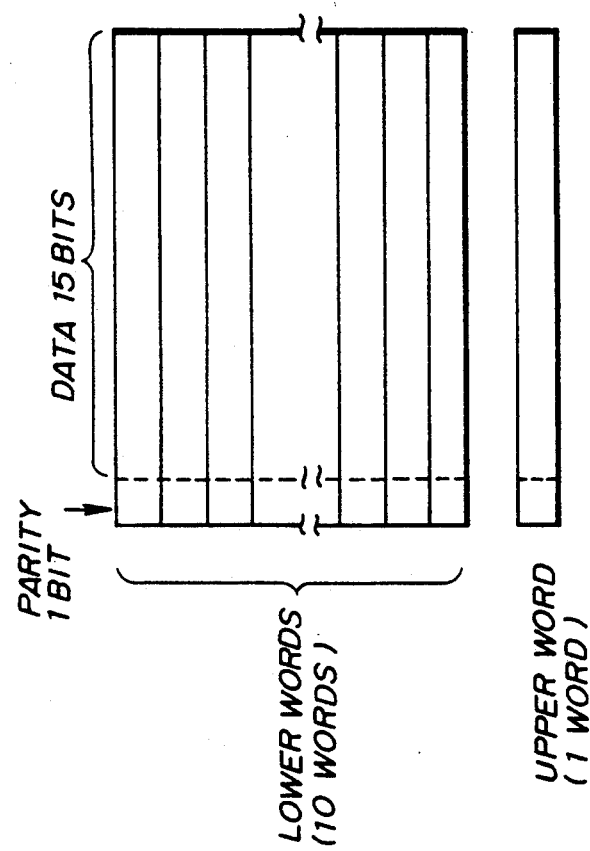
FIG. 1 is a diagram for explaining a conventional counted value storage system.
Figure 2:
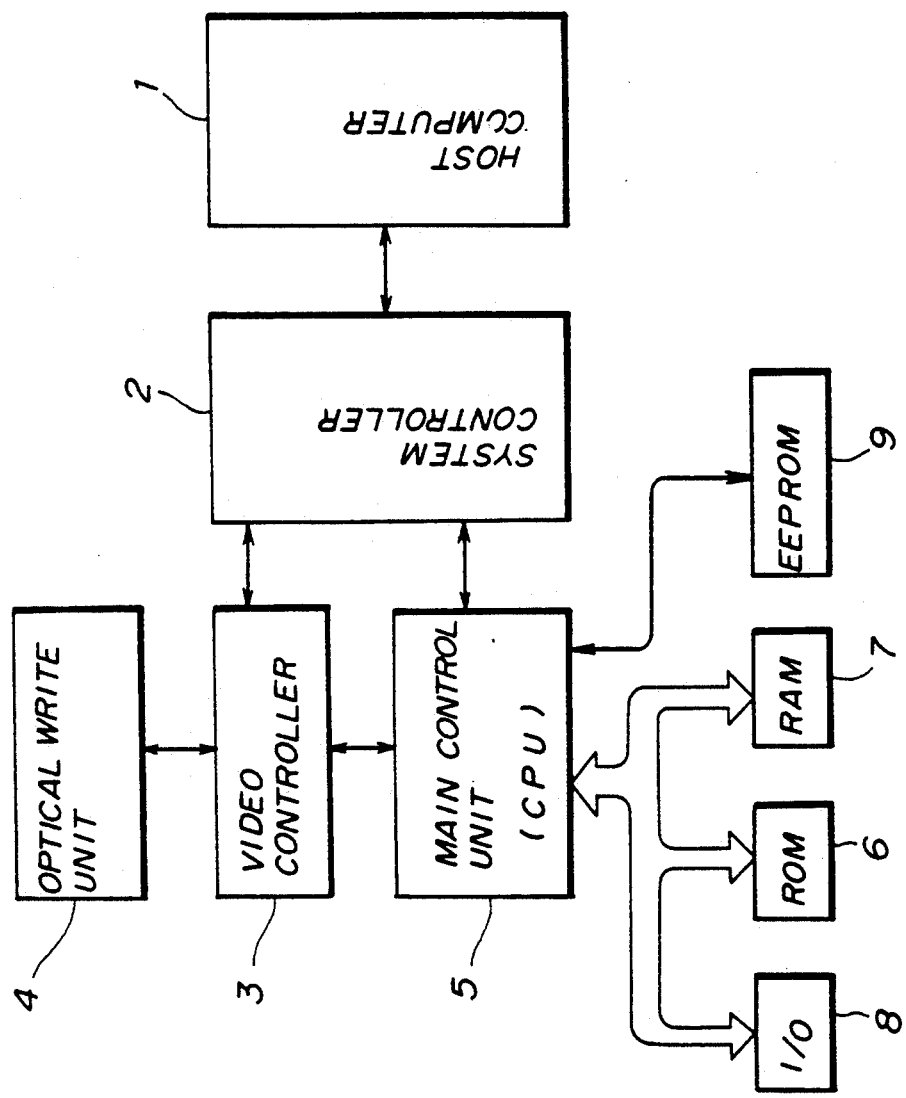
FIG. 2 is a system block diagram showing an embodiment of a counted value storage system according to the present invention.

FIG. 2 shows an embodiment of a counted value storage system according to the present invention. In this embodiment, the present invention is applied to a laser printer, and this embodiment of the system operates in conformance with an embodiment of a counted value storage method according to the present invention.

The counted value storage system shown in FIG. 2 includes a host computer 1, a system controller 2, a video controller 3, an optical write unit 4, a main control unit 5, a read only memory (ROM) 6, a random access memory (RAM) 7, an input/output interface 8 and an EEPROM 9 which are connected as shown.

The system controller 2 converts character codes and the like received from the host computer 1 into a video signal having a dot pattern. This video signal is supplied to the video controller 3 which supplies the video signal to the optical write unit 4 by synchronizing a write timing.

The main control unit 5 includes a central processing unit (CPU) which executes programs stored in the ROM 6 and the RAM 7. The main control unit 5 produces various driving control signals which are supplied to driving parts (not shown) of the laser printer. These driving control signals are produced in response to output signals of sensors (not shown) of the laser printer received via the input/output interface 8 and a synchronization detection signal received from the video controller 3. For example, the sensors include a sensor for detecting the paper size, a sensor for detecting the paper in a paper supply position, a sensor for detecting the temperature of a fixing unit (not shown) of the laser printer and the like. On the other hand, the driving parts include a control circuit for controlling the heater temperature of the fixing unit, a clutch coupled to a paper supply roller, a clutch coupled to a resist roller, a main motor and the like.

The EEPROM 9 is provided as a non-volatile memory for storing various data including a counted value corresponding to the number of prints made. The EEPROM 9 is coupled to the main control unit 5 via a serial line. The data stored in the EEPROM 9 can be output in a form of a display at an operation panel (not shown) or in a form of a print on the recording paper.

Figure 4:
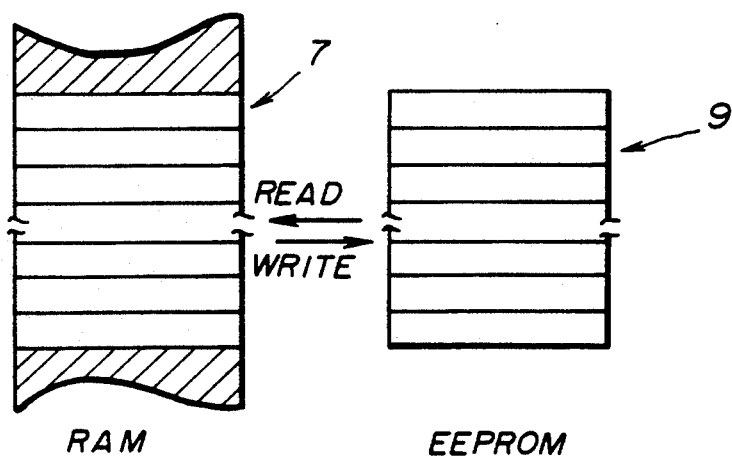
FIG. 4 is a diagram for explaining a data transfer between a RAM and an EEPROM shown in FIG. 2.

FIG. 3 is a flow chart showing a main routine of the main control unit 5 shown in FIG. 2. When a power source of the laser printer is turned ON in FIG. 3, a step S1 makes an initial setting of the laser printer by initializing the ROM 6, the RAM 7, the input/output interface 8 and the like. A step S2 develops all data stored in the EEPROM 9 in the RAM 7 as shown in FIG. 4.

A step S3 judges whether or not a print request is received from the system controller 2. When the judgement result in the step S3 becomes YES, a step S4 carries out a paper supply control so as to drive a paper supply unit (not shown) and supply the recording paper. A step S5 carries out a print control so as to operate the video controller 3, the optical write unit 4 and the like.

A step S6 carries out a write-in control with respect to the EEPROM 9. When a counted value to be written into the EEPROM 9 is the number of prints made, the write-in control is carried out after one or a plurality of prints are made. The process returns to the step S3 after the step S6.

Figure 5:
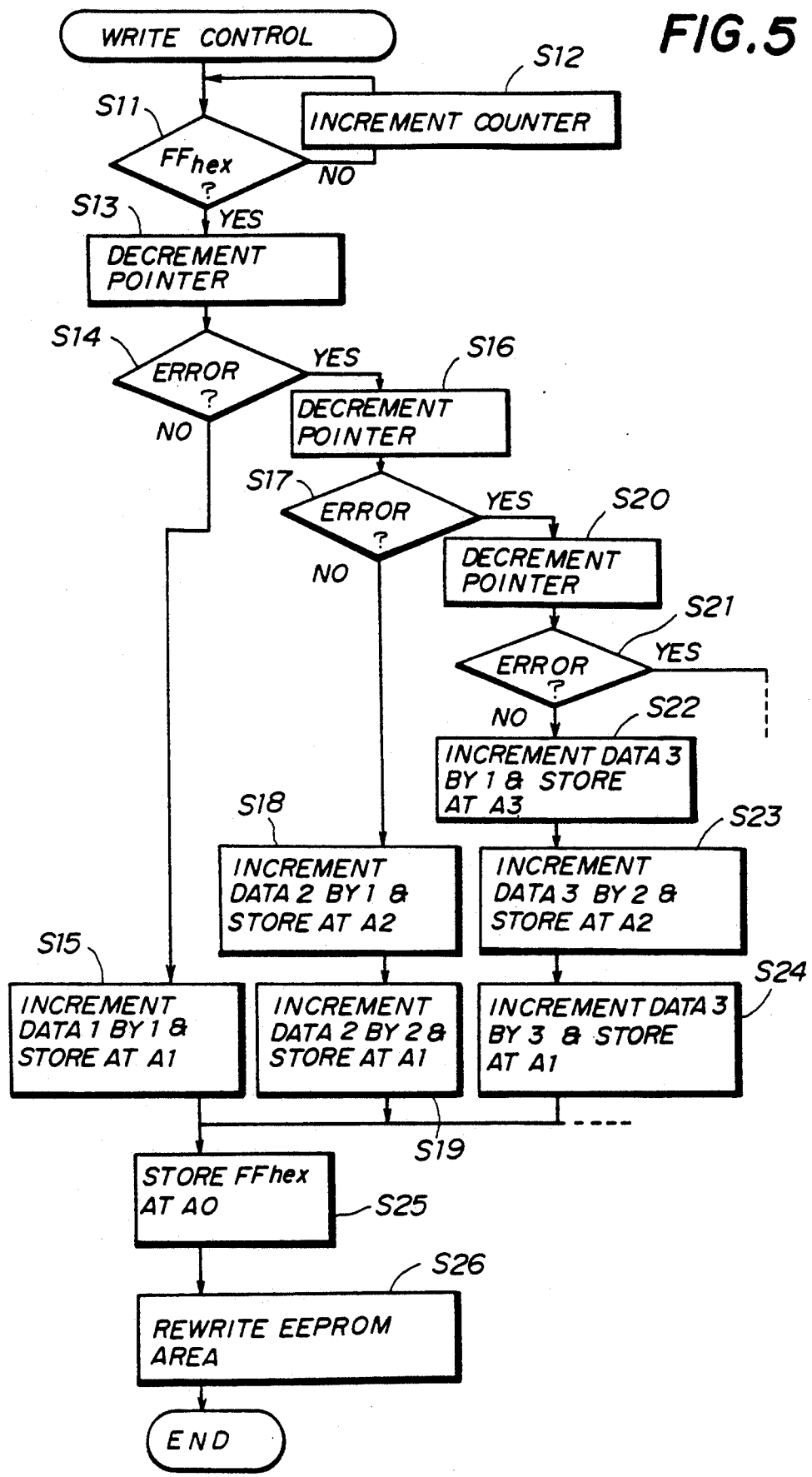
FIG. 5 is a flow chart showing a write-in control subroutine corresponding to a step S6 shown in FIG. 3.

FIG. 5 is a flow chart showing a write-in control subroutine corresponding to the step S6 shown in FIG. 3. The flow chart shown in FIG. 5 forms an essential part of the embodiment of the method. As described above, all the data within the EEPROM 9 are developed in the RAM 7 when the power source of the laser printer is turned ON, and the control is carried out based on the data in the RAM 7.

Figure 6:
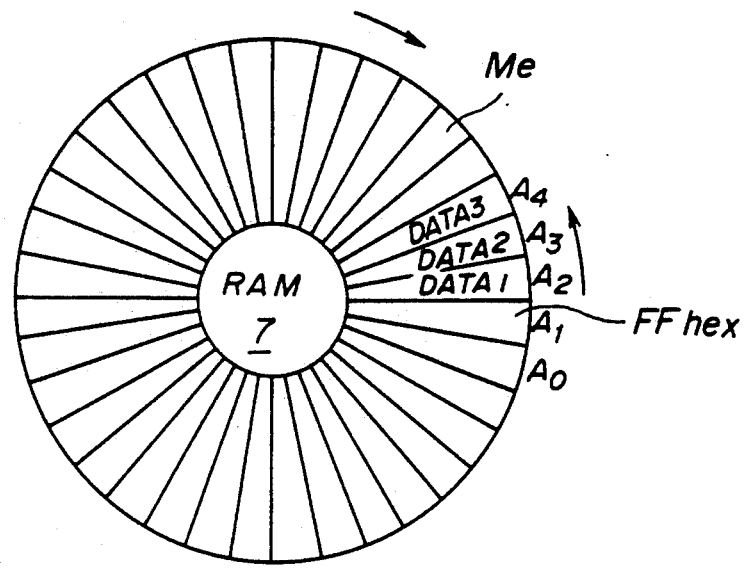
FIG. 6 is a diagram for explaining memory areas of a RAM shown in FIG. 2.

As shown in FIG. 6, the data corresponding to the counted value of the number of prints made and the like stored in the EEPROM 9 are developed in the RAM 7 which has memory areas Me for a plurality of words (bytes) arranged in a form of a ring. The memory area Me at each address has a memory capacity of one word (byte). The data ..., DATA3, DATA2, and DATA1 are successively stored in the memory areas Me starting from the lowest order address An, and a specific data $FF_{hex}$ is stored at an address next to the address where data was last stored. For example, when storing the counted value of the number of prints made into the EEPROM 9, a search is made for the address where data is to be next stored, that is, the address where the specific data $FF_{hex}$ is stored. A value indicated by the specific data $FF_{hex}$ is set greater than the maximum value of the counted value to be stored in the EEPROM 9.

Initially, the pointer indicates the lowest order address An. A step S11 judges whether or not an address indicated by the pointer stores the specific data $FF_{hex}$. When the judgement result in the step S11 is NO, a step S12 increments the pointer by one. Hence, the pointer is successively incremented to find the address where the specific data $FF_{hex}$ is stored. In this case, the specific data $FF_{hex}$ is stored at an address A1.

When the judgement result in the step S11 becomes YES, that is, when the pointer is incremented to a value which indicates the address A1 where the specific data $FF_{hex}$ is stored, a step S13 decrements the pointer by one. In other words, the pointer is decremented to a value which indicates the address A2, and the data DATA1 stored at the address A2 becomes the most recently updated counted value.

A step S14 carries out a parity check to determine whether or not a binary code error exists in the data DATA1 which is stored at the address A2. When no binary code error exists and the judgement result in the step S14 is NO, a step S15 increments the data DATA1 by one and stores the incremented data at the address A1. On the other hand, when the judgement result in the step S14 is YES, a step S16 decrements the pointer by one and a step S17 carries out a parity check to determine whether or not a binary code error exists in the data DATA2 which is stored at the address A3 indicated by the decremented pointer.

When no binary code error exists in the data DATA2 stored at the address A3 and the judgement result in the step S17 is NO, a step S18 increments the data DATA2 by one and stores the incremented data at the address A2. A step S19 increments the data DATA2 by two and stores the incremented data at the address A1.

On the other hand, when the judgement result in the step S17 is YES, a step S20 decrements the pointer by one and a step S21 carries out a parity check to determine whether or not a binary code error exists in the data DATA3 which is stored at the address A4 indicated by the decremented pointer.

When no binary code error exists in the data DATA3 stored at the address A4 and the judgement result in the step S21 is NO, a step S22 increments the data DATA3 by one and stores the incremented data at the address A3. A step S23 increments the data DATA3 by two and stores the incremented data at the address A2. In addition, a step S24 increments the data DATA3 by three and stores the incremented data at the address A1.

The process is carried out similarly to the above when the judgement result in the step S21 is YES. As a result, the parity check is carried out successively from the most recently updated data DATA1, and a new and correct data is stored from the address where the correct data is confirmed while correcting the data stored at the address where the binary code error is detected.

After the steps S15, S19 and S24, a step S25 stores the specific data $FF_{hex}$ at an address A0 to indicate the address where the data is to be next stored. Finally, a step S26 rewrites a memory area of the EEPROM 9 corresponding to the memory area Me of the RAM 7 where the data is changed to new data.

After the address A0, the lowest order address An is used again. Hence, the addresses of the RAM 7 are used circulatively.

According to this embodiment, it is possible to successively store the data of the counted values in the memory areas Me which amounts for example to 10 words which are arranged in a ring as shown in FIG. 6. Hence, by time the counted value "100,000" is counted, the data is written 10,000 times in each word.

Because it is possible to correct the data in which the binary code error is detected when reading the data from the EEPROM 9, it is possible to improve the reliability of the counted value storage system. Furthermore, since there is no need to store in the EEPROM 9 the pointer which indicates the data storage address, it is possible to increase the memory capacity which is allocated for the data.

According to the conventional counted value storage system, it is necessary to provide a storage area for the lower 10 words as shown in FIG. 7A in a ring, for example, and also a memory region for one upper word as shown in FIG. 7B. In this case, it is possible to correct the data in only the 10 lower words.

But when 3 upper words are provided in this embodiment as shown in FIG. 7C, the data in the upper word can also be corrected.

In addition, by counting 100,000 in such a manner that 0 to 1,000 are counted by the lower word and 0 to 100 are counted by the upper word, the data will not become $FFFF_{hex}$ and it is possible to clearly distinguish the data from $FFFF_{hex}$ which indicates the next address (write-in position) of the lower word.

In the described embodiment, the present invention is applied to a laser printer. However, the present invention may be applied to other image forming apparatuses and the like for storing various counted values corresponding to a number of prints, rotations of a motor, the number of times a current is applied and the like.

Further, the present invention is not limited to these embodiments, but various variations and modifications may be made without departing from the scope of the present invention.

What is claimed is:

1. A counted value storage system comprising:
    non-volatile memory means for successively storing a counted value in one of a plurality of memory areas having respective addresses; and
    control means coupled to said non-volatile memory means for controlling where the counted value is stored in said non-volatile memory means,
    said control means including means for circulatively designating a first address from a lowest order address and means for storing a predetermined data in said non-volatile memory means at a second address which is one greater than an arbitrary address where a most recently updated counted value is stored,
    said second address where said predetermined data is stored indicating where a next counted value is to be stored,
    said predetermined data indicating a value which is greater than a maximum value of a counted value which is stored in said non-volatile memory means.

2. The counted value storage system as claimed in claim 1 wherein said control means further includes check means for carrying out a parity check on the most recently updated counted value stored at said arbitrary address and correcting means for correcting the most recently updated counted value using an arbitrary counted value stored at a selected address of a lower order than said arbitrary address when said check means detects an error in said most recently updated counted value.

3. The counted value storage system as claimed in claim 2 wherein said control means further includes incrementing means for incrementing the most recently updated counted value by one so as to store an incremented counted value at the second address as a new most recently updated counted value and for storing said predetermined data at a third address which is two greater than said arbitrary address.

4. The counted value storage system as claimed in claim 2 wherein said check means further carries out a parity check on one or a plurality of counted values stored at addresses between said arbitrary address and said selected address, and said correcting means further corrects the counted values stored at the addresses between said arbitrary address and said selected address using said arbitrary counted value when said check means detects an error in the counted values stored at addresses between said arbitrary address and said selected address.

5. The counted value storage system as claimed in claim 1 wherein said non-volatile memory means comprises an electrically erasable programmable read only memory.

6. A counted value storage method comprising the steps of:
    successively storing a counted value in one of a plurality of memory areas of a non-volatile memory having respective addresses;
    circulatively designating a first address of the non-volatile memory from a lowest order address; and
    storing a predetermined data in the non-volatile memory at a second address which is one greater than an arbitrary address where a most recently updated counted value is stored,
    said second address where said predetermined data is stored indicating where a next counted value is to be stored,
    said predetermined data indicating a value which is greater than a maximum value of a counted value which is stored in said non-volatile memory.

7. The counted value storage method as claimed in claim 6 wherein said non-volatile memory comprises an electrically erasable programmable read only memory.

8. The counted value storage method as claimed in claim 6 which further comprises the steps of carrying out a parity check on the most recently updated counted value stored at said arbitrary address, and correcting the most recently updated counted value using an arbitrary counted value stored at a selected address smaller than said arbitrary address when an error is detected in said most recently updated counted value.

9. The counted value storage method as claimed in claim 8 which further comprises the steps of incrementing the most recently updated counted value by one so as to store an incremented counted value at the second address as a new most recently updated counted value, and storing said predetermined data at a third address which is two greater than said arbitrary address.

10. The counted value storage method as claimed in claim 8 which further comprises the steps of carrying out a parity check on one or a plurality of counted values stored at addresses between said arbitrary address and said selected address, and correcting the counted values stored at the addresses between said arbitrary address and said selected address using said arbitrary counted value when an error is detected in the counted values stored at addresses between said arbitrary address and said selected address.

11. A counted value storage system comprising:
   non-volatile memory means for storing counted values in storage locations which have respective addresses arranged in a recirculating sequence, said memory storing in one of its addresses predetermined data higher in value than the highest-values counted value which is to be stored in said memory;
   control means coupled to said non-volatile memory for controlling the address where each new counted value is to be stored;
   said control means including means responsive to a new counted value which is to be stored in the non-volatile memory to:
      identify as a current address the address where said predetermined data are stored by starting at a selected address and checking the contents of successive addresses until said predetermined data are encountered;
      store the new counted value at said current address in place of said predetermined data; and
      store the predetermined data at the next higher address in said non-volatile memory to thereby make said next higher address the new current address;
   wherein the address of the most recently stored counted value is the address preceding that of said predetermined data in said recirculating sequence of addresses, and the number of addresses in said memory is substantially less than the number of counted values so that only a selected number of the most recent counted values are stored in said memory at any one time.

12. A counted value storage system as in claim 11 including means for error checking the most recently stored counted value and, in the case of the detection of an error therein, identifying the counted value which is the previous most recently stored in said memory that is error-free and incrementing said previous counted value in accordance with the difference between the addresses of said previous and said most recently stored counted values and storing the resulting incremented counted value in place of the most recently stored counted value in said memory.

* * * * *